(12) United States Patent
Kockmann et al.

(10) Patent No.: US 7,133,390 B1
(45) Date of Patent: Nov. 7, 2006

(54) METHOD AND SYSTEM FOR LOGGING ON A MOBILE UNIT AT A FIXED STATION

(75) Inventors: Jürgen Kockmann, Düsseldorf (DE); Uwe Sydon, Düsseldorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/485,662

(22) PCT Filed: Aug. 14, 1997

(86) PCT No.: PCT/DE97/01750

§ 371 (c)(1),
(2), (4) Date: Aug. 31, 2000

(87) PCT Pub. No.: WO99/09672

PCT Pub. Date: Feb. 25, 1999

(51) Int. Cl.
*H04J 3/00* (2006.01)

(52) U.S. Cl. .................... 370/337; 370/347; 455/426.1

(58) Field of Classification Search ............... 370/436, 370/437, 442, 458, 461, 462, 329, 337, 334, 370/347, 503; 455/422.1, 426.1, 462, 465
See application file for complete search history.

(56) References Cited

U.S. PATENT DOCUMENTS

| | | | |
|---|---|---|---|
| 5,278,835 A * | 1/1994 | Ito et al. ..................... 370/311 |
| 5,515,369 A | 5/1996 | Flammer, III et al. |
| 5,787,076 A * | 7/1998 | Anderson et al. ........... 370/294 |
| 5,818,820 A * | 10/1998 | Anderson et al. ........... 370/280 |
| 5,892,794 A * | 4/1999 | Slegers ....................... 375/219 |
| 5,903,618 A * | 5/1999 | Miyake et al. .............. 375/356 |
| 6,272,121 B1* | 8/2001 | Smith et al. ................ 370/342 |

FOREIGN PATENT DOCUMENTS

| | | |
|---|---|---|
| DE | 34 15 032 A1 | 11/1984 |
| EP | 0 650 304 A2 | 4/1995 |
| EP | 0 767 551 A2 | 4/1997 |
| WO | WO 95/06377 | 3/1995 |

* cited by examiner

*Primary Examiner*—Doris H. To
*Assistant Examiner*—Thai Hoang
(74) *Attorney, Agent, or Firm*—Bell, Boyd & Lloyd LLC

(57) ABSTRACT

A method and system for the wire-free transmission of data between a mobile unit and a fixed station in time slots on one of a number of carrier frequencies with fixed station and the mobile unit each respectively include both a device for outputting a predetermined sequence which prescribes the carrier frequencies of the time slots, the carrier frequencies of two successive time slots being different, and an RF module for transmitting the data in time slots, the carrier frequencies of the time slots each being prescribed by the predetermined frequency of the output device.

13 Claims, 2 Drawing Sheets

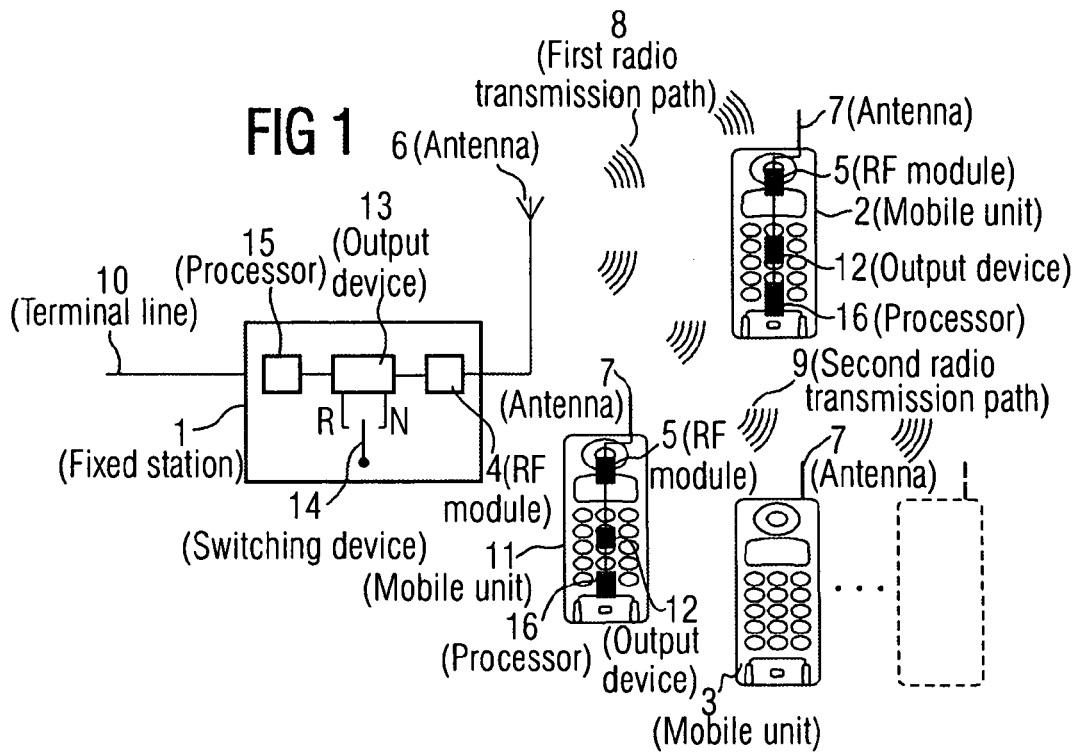
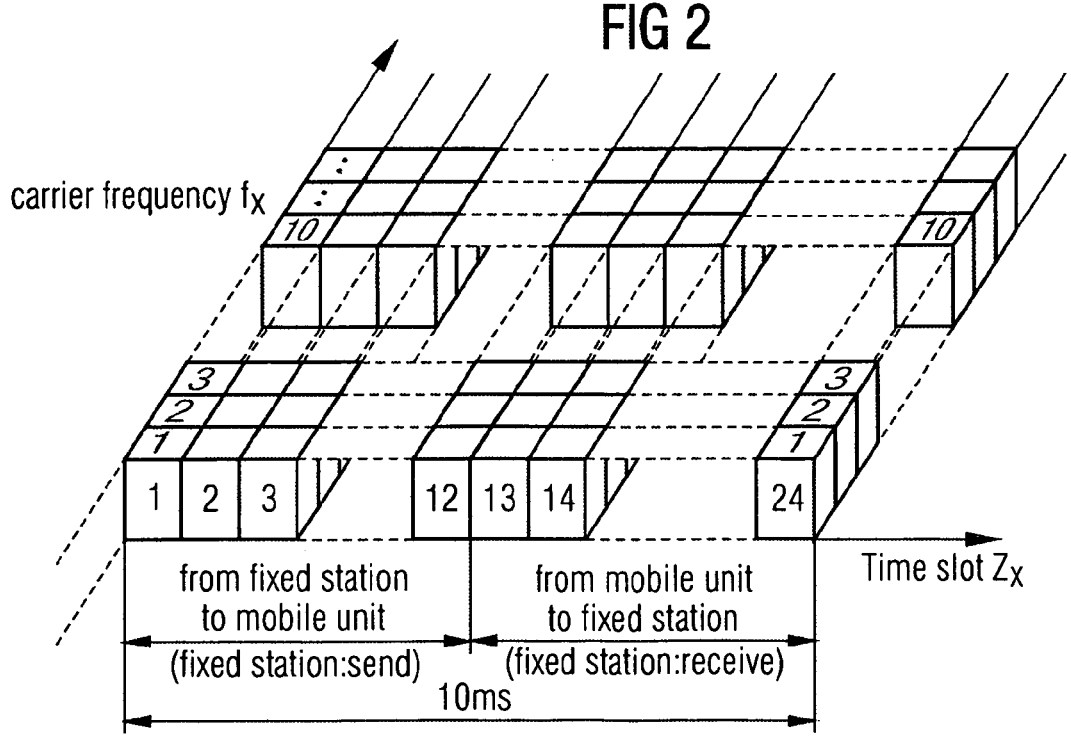

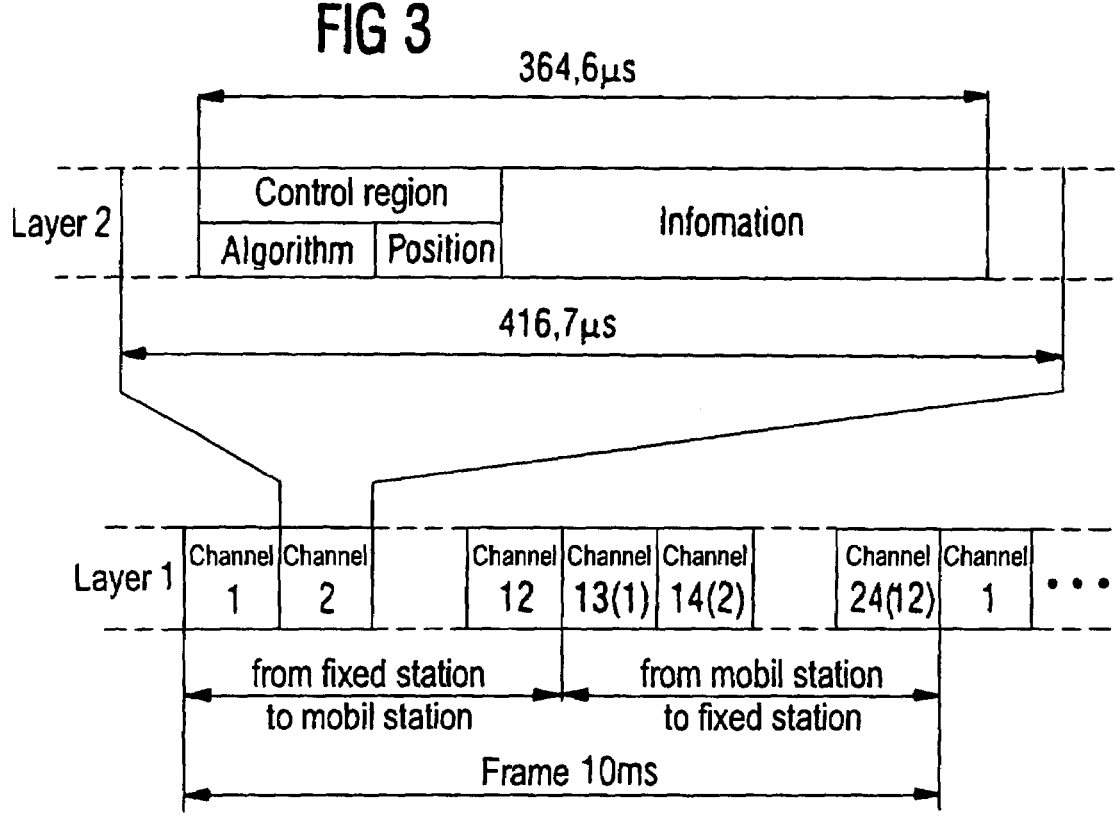
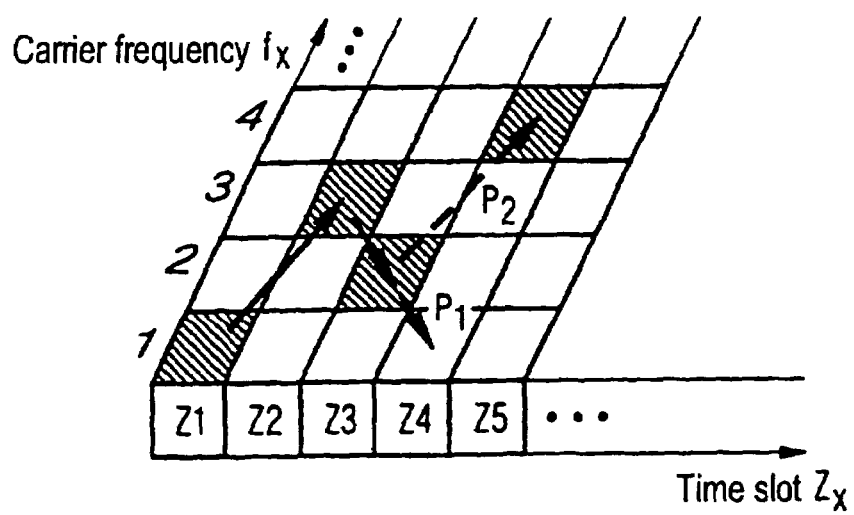

METHOD AND SYSTEM FOR LOGGING ON A MOBILE UNIT AT A FIXED STATION

The present invention relates to a method and system for logging on a mobile unit at a fixed station for a transmission of data by radio, in which transmission the data is transmitted in time slots on a number of carrier frequencies and the carrier frequency is changed from one time slot to the next in accordance with a predetermined sequence.

DESCRIPTION OF THE PRIOR ART

In the majority of cordless telephones currently available on the market, it is possible to serve more than one mobile unit from a fixed station. Often, a cordless telephone system is retrofitted by adding a further mobile unit to the already existing mobile unit or units. For this purpose, the new mobile unit must be logged on in the already existing cordless telephone system; i.e., in particular, at the fixed station. Logging on is, therefore, to be understood within the context of the present Invention to mean that a mobile unit, in particular a further mobile unit, is logged on in the sense of signing on at the fixed station. As such, once logging on has taken place, the mobile unit can transmit voice information data to the fixed station and receive it from the fixed station as well.

Problems are experienced if a so-called frequency hopping spread spectrum system is used as air interface and a mobile unit, in particular a further mobile unit, is to be integrated into such a system. A frequency hopping spread spectrum system is a system in which a number of carrier frequencies are available for transmitting data by radio and the carrier frequency used is changed from time to time, for example, after each time slot or frame of the transmission. In particular, in a time division multiplex system (TDMA), the carrier frequency can be changed after each time slot or time frame of the time division multiplex transmission. Such a frequency hopping spread spectrum system has advantages to the extent that the energy of the entire radio transmission is distributed over all the carrier frequencies and, thus, one single carrier frequency less is loaded. This is particularly important if a generally available frequency band, such as the 2.4 0 Hz 1524 (Industrial Scientific Medical) band, is used in which an upper limit for the maximum energy occurring per carrier frequency is prescribed in order to keep interference with other subscribers as low as possible.

A further advantage of the frequency hopping spread spectrum system is that the provision of a large number of carrier frequencies makes the system less susceptible to interference. Furthermore, the protection of the system against listening in by third parties is increased, since the third party does not usually know what the carrier frequency is being changed to after a certain time period.

Even if a frequency hopping spread spectrum system has the abovementioned advantages, there is still the problem of synchronizing the carrier frequencies and, in particular, of changing the carrier frequencies when logging on a new mobile unit at a fixed station. It is, in fact, a precondition of logging on that the mobile unit to be logged on is capable of communicating with the fixed station; i.e., can precisely perform the change of carrier frequency.

WO 95/06377 teaches a method and an system for transmitting data wirelessly between a mobile unit and a fixed station in time slots on a number of carrier frequencies. In this method and system, the carrier frequencies of a predetermined time period are changed in accordance with a predetermined sequence. To accomplish this, the mobile unit and the fixed station each include a device for outputting the predetermined sequence and an HF module for transmitting the data in the time slots.

An object of the present invention, therefore, is to provide a method and system for logging on a mobile unit at a fixed station a mobile unit is enabled to be logged on at a fixed station for a data transmission system, in which system data is transmitted in time slots on a number of carrier frequencies and the carrier frequency is changed from one time slot to the next.

SUMMARY OF THE INVENTION

This object is achieved according to the present invention by a method for logging on a mobile unit at a fixed station for a transmission of data by radio, in which transmission the data is transmitted in time slots on a number of carrier frequencies (TDMA system) and the carrier frequency is changed, for example, from one time slot to the next time slot in accordance with a predetermined sequence. According to the present invention, check data which indicates the position of the carrier frequency of the current (instantaneously broadcast) time slot in the predetermined sequence is broadcast by the fixed station. The mobile unit can then determine the position of the carrier frequency of the current time slot in the predetermined sequence via the check data. The mobile unit to which the entire sequence is known can then determine, on the basis of the position of the carrier frequency in the predetermined sequence, the carrier frequency which is to be changed to next. As a result, synchronization of the change of the carrier frequency of the mobile unit with that of the fixed station is achieved.

The check data can be transmitted only during a logging-on mode. After the logging-on mode has been terminated, normal transmission of, for example, voice information data between the mobile unit and the fixed station then can take place.

The carrier frequency change can be carried out via a sequence selected from a plurality of predetermined sequences. The check data then can indicate, beyond the position of the carrier frequency of the current time slot in the predetermined sequence, which of the number of predetermined sequences is selected and used. The predetermined sequences can be determined, in particular an algorithm (hop algorithm).

It is possible to sense which of the number of carrier frequencies is subject to interference. During the logging on of the mobile unit at the fixed station, a carrier frequency which is prescribed by the predetermined sequence also is used if this carrier frequency has been sensed as being subject to interference. After the logging on has been concluded, that carrier frequency of the predetermined sequence which is subject to interference is passed over during the normal transmission of data. This ensures that, during the logging-on mode, the carrier frequency change prescribed by the predetermined sequence is strictly carried out in order to ensure that the frequency of the mobile unit is synchronized with that of the fixed station in the sense of logging on. In particular, the so-called 2.4 GHz ISM frequency band can be used for transmission. Also, the number of available carrier frequencies can be at least 75 and, in particular, 96.

In addition, according to the present invention a system for wire-free transmission of data between a mobile unit and a fixed station is provided. The fixed station here has an RF module for transmitting the data in time slots on a number of carrier frequencies in the sense of a time division multiplex system. A device stores a predetermined sequence in order to define a change of the carrier frequency, for example from one time slot to the next, and outputs this predetermined sequence to the RF module. The data broadcast by the fixed station have check data which indicates the position of the carrier frequency of the current time slot in the predetermined sequence. The mobile unit has a device for determining the position of the carrier frequency of the current time slot in the predetermined sequence via the check data. In an alternative embodiment, the check signal also can specify the carrier frequency which the base station will "jump to" next.

In yet a further embodiment, the check data can specify which carrier frequency the base station will use in the m-th time slot or m-th frame. This is advantageous if a mobile unit is in the so-called idle-locked or multiframe mode. In such a mode, a mobile unit resynchronizes with the base station only in every m-th time slot or frame if the mobile unit is not in the process of active voice communication with the base station.

The check data does not have to be broadcast in every time slot or frame. If a mobile unit which would like to synchronize with a base station receives a time slot or frame which does not contain check data, it scans all the carrier frequencies again. This procedure is repeated until the mobile unit receives from the base station a time slot or frame which contains the check data.

The fixed station can have a switching device for switching over between a logging-on mode, in which a mobile unit, or a further mobile unit, can be logged on at the fixed station, and a normal transmission mode for normal transmission of information data. The check data is broadcast automatically only if the switching device is switched to the logging-on mode. In the normal transmission mode, the check data is not broadcast, or is only broadcast on request.

A number of predetermined sequences can be provided in the output device. The check data then has data which goes beyond the position data and which indicates the sequence currently in use. In addition, the output device can have a processor which calculates the predetermined sequence via an algorithm.

Additional features and advantages of the present invention are described in, and will be apparent from, the Detailed Description of the Preferred Embodiments and the Drawings.

DESCRIPTION OF THE DRAWINGS

FIG. 1 shows a system of the present invention for transmitting data in a wire-free fashion;

FIG. 2 shows a time frame of a data transmission standard such as is used in the present invention;

FIG. 3 shows a detailed illustration of a time frame for a carrier frequency in accordance with the present invention; and FIG. 4 shows a schematic representation of a frequency hopping spread spectrum system.

DETAILED DESCRIPTION OF THE PREFERRED EMBODIMENTS

With reference to FIG. 1, the general design of the system according to the present invention for radio transmission will be explained first. As is generally known, a system for the transmission of data by radio has a fixed station 1 and a plurality of mobile units (mobile stations, cable-free telephones) 2, 3, 11. The fixed station 1 is connected to the landline network with a terminal line 10. The fixed station 1 has an antenna 6 via which it is possible to communicate, for example, with the mobile unit 2 via a radio transmission path 8 or with the mobile unit 3 via a radio transmission path 9. The mobile units 2, 3, 11 each have an antenna 7 for receiving and transmitting data.

The internal design of a fixed station 1, insofar as it is of significance for the present invention, will now be explained in more detail. A processor 15 which determines a predetermined sequence via a predetermined algorithm (hop algorithm) is provided in the fixed station 1. As an alternative, a number of different algorithms may be provided in the processor 15 so that it can determine different sequences in accordance with the respectively used algorithm. The sequences determined by the processor 15 are then transmitted to a storage and output device 13. The storage and output device 13 transmits to an RF module 4 either the sequence which is continuously determined by the processor 15 or a sequence which has been previously permanently stored in it.

The RF module 4 receives and transmits data on a carrier frequency $f_x$ which depends on the current value of the sequence transmitted from the storage and output device 13. Therefore, a radio transmission takes place on a carrier frequency $f_x$ wherein the currently used carrier frequency either is determined indirectly by the processor 15 via an algorithm or, alternatively, is determined directly from the value of a sequence which has been permanently stored in the storage and output device 13.

The internal design of a mobile radio unit, insofar as it is relevant to the present invention, will now be described in more detail. In this respect, the design of a mobile radio unit 2, 3, 11 is substantially symmetrical to the internal design of the fixed station 1 described above. That is, each mobile radio unit 2, 3, 11 has, as illustrated in the present invention only for the mobile radio units 2 and 11, a processor 16. This processor 16 determines, via either one or a number of available hop algorithms, a sequence which it transmits to a storage and output device 12. The storage and output device 12 transmits to an RF module 5 either the values of the sequence based on the algorithm which are determined continuously by the processor 16 or, alternatively, the values of a sequence which has been permanently stored in it. The RF module 5 transmits or receives data on a carrier frequency $f_x$ whose level depends on the value of the sequence transmitted to it by the storage and output device 12. A mobile unit 2, 3, 11 therefore receives or transmits data on a carrier frequency $f_x$ whose level depends either on the current value of the sequence determined by the processor 16 or on the value of a sequence which has been permanently stored in the storage and output device 12.

It is to be noted here that the processor 15 in the fixed station 1 and the processors 16 in the mobile units 2, 3, 11 are based on the same algorithm for determining sequences or, in the event that a number of algorithms are available, have the same selection of algorithms. In the event that the sequence is not determined continuously by the processor 15, 16 but rather permanently prescribed in the storage and output devices 12, 13, the sequence which is stored in the storage and output device 13 of the fixed station 1 is, of course, identical to the sequences which are respectively stored in the storage and output devices 12 of the mobile units 2, 3, 11.

A transmission standard such as is used in the present invention will now be explained with reference to FIG. 2. As is clear in FIG. 2, data is transmitted in chronological succession in a number of time slots (24 time slots Zx in the case illustrated), using the time division multiplex method TDMA (Time Division Multiple Access) on a number of carrier frequencies $f_x$ (of which ten are illustrated). In FIG. 2, duplex mode is used on the carrier frequencies. This means that after the base station has transmitted the first twelve time slots Zx, it switches to reception and it receives the second twelve time slots (13–24) in the opposing direction.

In the event that the so-called DECT Standard is used for transmission, the chronological duration of a time frame is 10 milliseconds, and 24 time slots Zx are provided, namely twelve time slots for the transmission from the fixed station to mobile units and a further twelve time slots Zx for the transmission from the mobile units to the fixed station. In the DECT Standard, 10 carrier frequencies $f_x$ between 1.88 GHz and 1.90 GHz are provided.

However, the present invention also is used for transmission in the so-called 2.4 GHz ISM (Industrial Scientific Medical) frequency band. The ISM frequency band has a bandwidth of 83.5 MHz. In accordance with the specification "FCC Part 15" (Federal Communications Commission), at least 75 carrier frequencies must be distributed over these 83.5 MHz. Distributing the 83.5 MHz bandwidth over 96 carrier frequencies, i.e. a channel spacing of 864 kHz, is particularly advantageous.

The abovementioned frequency bands and standards are mentioned purely by way of example. The only fundamental precondition for the present invention is that a so-called frequency hopping spread spectrum is used; i.e., a number of carrier frequencies are available and the carrier frequency $f_x$ selected for the transmission is changed from time to time. A precondition of such a change is that the data be transmitted in time slots Zx (time division multiplex method). The so-called DECT Standard as well as any other modified standard based on this DECT Standard, is therefore suitable. A modification can, in this respect, include a reduction (halving) in the number of time slots per frame, as a result of which the bit rate and, consequently, the necessary basic bandwidth of the transmission can be reduced (halved).

How the selection of a carrier frequency $f_x$ for a specific time slot Zx is carried out will now be explained with reference to FIG. 4. It will be assumed that, at the time of the time slot Z1, the processor 15 of the fixed station 1 determines, on the basis of an algorithm, a value which the RF module 4 of the fixed station 1 converts indirectly into a carrier frequency $f_1$. In FIG. 4, the hatching shows that the carrier frequency $f_1$ is selected at the time of the time slot Z1. At the transition from the time slot Z1 to the following time slot Z2, the carrier frequency $f_x$ is inevitably changed. As is illustrated by an arrow in FIG. 4, it is possible, for example, for the processor 15 of the fixed station 1 to determine via its algorithm a value which is converted by the RF module 4 into a carrier frequency $f_3$. In the same way, a carrier frequency $f_2$ then can be selected for the time slot Z3, which is illustrated by hatching and by an arrow.

In the example above, the case was explained in which the carrier frequency is changed after a time slot in each case. However, for the present invention it is only significant that the change of the carrier frequency takes place in each case after a predetermined time period. This also may be, for example, a frame.

The fixed station 1, therefore, changes the carrier frequency $f_x$ from the carrier frequency $f_1$ to the carrier frequency $f_3$ and then to the carrier frequency $f_2$ on the basis of the sequence determined by the processor 15. If communication is to take place between the fixed station 1 and a mobile unit 11, it is necessary to ensure that the mobile unit 11 can follow synchronously the sequence of carrier frequency $f_x$ changes carried out by the fixed station 1. This is a particular problem when a mobile unit 11 first is to be integrated into a radio transmission system; i.e., has to be logged on and signed on at the fixed station 1. During unsynchronized operation of the new mobile unit 11 after it has been switched on, the mobile unit 11 will change the carrier frequencies $f_x$ used in the way prescribed by its sequence. The sequence as such is identical here with the sequence 1, which is prescribed in the fixed station 1 and explained above. However, this does not ensure that the sequence of the mobile unit 11 is synchronized with the sequence of the fixed station 1 after the mobile unit 11 has been switched on.

FIG. 3 illustrates how it is ensured according to the present invention that the new mobile unit 11 carries out carrier frequency changes which are synchronous with the fixed station 1. As is clear in FIG. 3, the data transmitted in a time slot (channel) Zx is, for the most part, information data; i.e., for example, data which represents an item of voice information of a telephone call. Before the range of the information data there is then a check range which is referred to as A field in the DECT Standard. In this check range, data is provided for synchronizing the operation of a mobile unit 11 to be logged on with the operation of the fixed station 1. If a number of algorithms are available to the processor 15 in the fixed station 1 for determining the sequence which directly prescribes the changes of the carrier frequency $f_x$ of the fixed station 1, the check range contains data which identifies the algorithm currently in use. Further synchronization data contained in the check range is data which indicates which position in the predetermined sequence corresponds to the carrier frequency $f_x$ used for the current time slot Zx. The data of the check range which is illustrated in FIG. 3, namely data which refers to the algorithm used and which refers to the current position of the sequence of the current algorithm, is broadcast by the fixed station 1 to the mobile unit 11. As an alternative, the check signal also can specify the carrier frequency which the base station will "jump to" next.

As a further alternative, the check data can specify which carrier frequency the base station will use in the m-th time slot or m-th frame. This is advantageous if a mobile unit is in the so-called idle-locked or multiframe mode. In such a mode, a mobile unit resynchronizes with the base station only in every m-th time slot or frame if said mobile unit is not in the process of active voice communication with the base station.

The check data does not have to be broadcast in every time slot or frame. If a mobile unit which would like to synchronize with a base station receives a time slot or frame which does not contain check data, it scans all the carrier frequencies again. This procedure is then repeated until the mobile unit receives from the base station a time slot or frame which contains the check data.

After it has been switched on, the mobile unit 11 scans the available range of carrier frequencies $f_x$ until it senses the carrier frequency $f_x$ currently being used by the fixed station 1. During this sensing of the carrier frequency $f_x$ currently in use, the mobile unit 11 also senses the data of the check range of the data broadcast by the fixed station 1. At first, the mobile unit 11 can determine which algorithm is currently being used by the processor 15 in the fixed station 1. This algorithm, of course, indirectly prescribes the charging of the carrier frequencies of the fixed station 1.

In addition, the mobile unit 11 can sense, from the position data of the check range, which position in the predetermined frequency corresponds to the broadcast carrier frequency. The mobile unit 11 then is, therefore, aware of the algorithm in use and of the position in the sequence. The mobile unit 11 can then determine independently via the position in the sequence, which is known here, as well as the sequence stored in it, which carrier frequency $f_x$ will be used by the fixed station 1 in the following time slot $Z_x$. From the information fed to it, the mobile unit 11 can generate information for the carrier frequencies to be used in the following time slots $Z_x$. Thus, it is possible to communicate with the fixed station 1 as is necessary for a signing-on or logging-on procedure. As a result of the information supplied relating to the future carrier frequency change, the mobile unit 11, is therefore, synchronized with the fixed station 1.

The fixed station 1 can have a switching device 14 which can be switched between two positions; namely, a position in the logging-on mode R and a position corresponding to the normal transmission mode. Only if the switching device 14 is switched to logging-on mode R does the fixed station 1 automatically broadcast the check range data necessary for synchronization with a mobile unit to be newly logged on. This data is namely, the information relating to the algorithm in use and the information relating to the position in the predetermined frequency on the basis of the algorithm. If the switching device 14 is switched to the normal transmission mode N, the aforesaid synchronization data are normally not broadcast; that is, only broadcast on request from a mobile unit.

A problem when logging on a further mobile unit 11 can result from a so-called noise source fall-back mode. First, it will be explained what action the fixed station 1 takes in accordance with this noise source fall-back mode with regard to the carrier frequency selection. With reference to FIG. 4, it is clear that at the time of the time slot Z3 the carrier frequency $f_2$ is indicated by the predetermined frequency. It now will be assumed that the predetermined sequence for the time of the time slot Z4 indicates a change to the carrier frequency $f_4$. In addition, it will be assumed that, for example in the preceding time frame of the transmission, the fixed station 1 has determined that interference occurred during a transmission on the carrier frequency $f_4$. This interference may result, for example, from the fact that another radio transmission system is adversely affecting this carrier frequency $f_4$. If the fixed station 1 is in the so-called noise source fall-back mode, when selecting the carrier frequency $f_x$ for the time slot Z4 it will not select the carrier frequency $f_4$ which is, of course, actually prescribed by the predetermined frequency. The carrier frequency $f_4$ which is sensed as being subject to interference is instead passed over and another carrier frequency $f_x$, for example the carrier frequency $f_x$ which follows in the predetermined frequency, is selected for the time slot Z4 (as illustrated by the arrow $P_1$). In the case illustrated in FIG. 4, the carrier frequency selected for the time slot Z4 is not, therefore, the carrier frequency $f_4$ which is sensed as being subject to interference but is instead the carrier frequency $f_1$ which is sensed as being free of interference.

Even if this noise source fall-back mode has, great advantages during the radio transmission mode with mobile units 2, 3 which already have been integrated, it is clear that this noise source fall-back mode simultaneously causes large problems for the logging on of a new mobile unit 11. The mobile unit 11 will, in fact, determine, on the basis of the algorithm stored in it and the position of the carrier frequency which is known to it from the check range of the data transmitted from the fixed station, in the predetermined sequence in accordance with the algorithm at the time of the time slot Z3, that a transmission on the carrier frequency $f_4$ will take place starting from the next value of the sequence at the time of the time slot Z4. However, if, owing to the noise source fall-back mode, the fixed station 1 selects the carrier frequency $f_1$ at the time of the time slot Z4 in order to avoid the carrier frequency $f_4$ which is subject to interference, and at the same time the mobile unit 11 to be logged on selects, on the basis of the information available to it, the carrier frequency $f_4$ at the time of the time slot Z4, synchronization of the operation of the fixed station 1 with that of the mobile unit 11 fails. If, for this reason, the logging-on mode R is selected by the switching device 14 in the fixed station 1, the noise source fall-back mode of the fixed station 1 is simultaneously switched off. This means that, in contrast with the normal mode in which the fixed station 1 will, in order to avoid the carrier frequency $f_4$ which has been recognized as being subject to interference, switch, in a position of the switching device 14 in logging-on mode R, to the carrier frequency $f_4$ at the time of the time slot Z4 as is prescribed by the sequence on the basis of the algorithm of the processor 15. This is so even though the fixed station 1 is aware that the carrier frequency $f_4$ is subject to interference. The change of the carrier frequency $f_x$ from time slot Z3 to time slot Z4 is illustrated in FIG. 4 by the unbroken arrow $P_2$. As a result of the fact that the noise source fall-back mode of the fixed station 1 is simultaneously switched off when the switching device 14 is positioned in logging-on mode R, it is therefore ensured that a synchronization of the operation of the mobile unit 11 with that of the fixed station 1 can take place. After the signing-on procedure or logging on of the mobile unit 11 at the fixed station 1 has been completed, the switching device 14 is then switched back from the logging-on mode R to the normal transmission mode N, which can take place in an automated way, and the noise source fall-back mode can be switched on again automatically.

However, the noise source fall-back mode also can remain switched on during the signing-on procedure. In this context, it is to be noted that, in accordance with the exemplary embodiment, 96 carrier frequencies are provided, of which a maximum of 21 can be locked out in order to avoid impinging upon the US-American Specification "FCC part 15". Therefore, the mobile unit knows the majority of carrier frequencies used, even in the noise source fall-back mode. Thus, if communication does not come about between the mobile unit and the fixed station in a frame owing to a frequency lock-out which is not known to the mobile unit, in all probability it will be possible to resume communication in the next frame with a new carrier frequency.

Therefore, according to the present invention, a method and a device for ensuring synchronism during the initial logging on of a new mobile unit at a fixed station is provided with a so-called frequency hopping spread spectrum system on a time division multiplex basis.

Although the present invention has been described with reference to specific embodiments, those of skill in the art will recognize that changes may be made thereto without departing from the spirit and scope of the invention as set forth in the hereafter appended claims.

We claim:

1. A method for logging-on a mobile unit at a fixed station, the method comprising the steps of:

selecting, at the fixed station, a sequence in which a plurality of carrier frequencies are changed from one time period to the next when communicating with the fixed station;

transmitting data from the fixed station, wherein the data comprises check data, said check data comprising identification of the selected sequence and a time slot position of a specific carrier frequency being used by the fixed station during the step of transmitting;

determining, via the mobile unit, the specific carrier frequency being used by the fixed station when the data was transmitted;

determining, via the mobile unit, the selected sequence in which the plurality of carrier frequencies are changed from one time period to the next, using the transmitted check data;

determining, via the mobile unit, the time slot position of the specific carrier frequency relative to the selected sequence, using the transmitted check data;

determining, via the mobile unit, a subsequent carrier frequency used in a subsequent time period relative to the time slot position of the specific carrier frequency, using the check data; and changing to the subsequent carrier frequency, via both the mobile unit and the fixed station, after a predetermined time period in accordance with the selected sequence.

2. A method for logging-on a mobile unit at a fixed as claimed in claim 1, the method further comprising the step of:

automatically transmitting the check data during a logging-on mode between the mobile unit and the fixed station.

3. A method for logging-on a mobile unit at a fixed as claimed in claim 1, wherein the fixed station and mobile unit include a plurality of different sequences in which the plurality of carrier frequencies are changed from one time period to the next.

4. A method for logging-on a mobile unit at a fixed station as claimed in claim 1, wherein the set of selecting, at the fixed station, a sequence in which one or more carrier frequencies are changed from one time slot to the next is determined via an algorithm.

5. A method for logging-on a mobile unit at a fixed station as claimed in claim 1, the method further comprising the steps of:

sensing which of the plurality of carrier frequencies is subject to interference;

using, during the logging-on of the mobile unit, a carrier frequency which is prescribed by the predetermined sequence and has been sensed as being subject to interference; and passing over the carrier frequency sensed as being subject to interference after logging-on has been completed.

6. A method for logging-on a mobile unit at a fixed station for a transmission of data by radio as claimed in claim 1, wherein a 2.4 GHz ISM frequency band is used for transmission.

7. A method for logging-on a mobile unit at a fixed station for a transmission of data by radio as claimed in claim 1, wherein the number of available carrier frequencies is at least 75.

8. A method for logging-on a mobile unit at a fixed station for a transmission of data by radio as claimed in claim 1, wherein the number of available carrier frequencies is at least 96.

9. A system for the transmission of data between a mobile unit and a fixed station, the system comprising:

a fixed station, the fixed station comprising:

a processor that selects a sequence in which a plurality of carrier frequencies are changed from one time period to the next when communicating with the fixed station; and a transmitting module that transmits data from the fixed station, wherein the data comprises check data, said check data comprising identification of the sequence selected by the processor, and a time slot position of a specific carrier frequency being used by the fixed station during transmission;

a mobile unit, wherein the mobile unit comprises a processor that determines the specific carrier frequency being used by the fixed station when the data was transmitted, the selected sequence in which one or more carrier frequencies are changed from one time period to the next, using the transmitted check data, the time slot position of the specific carrier frequency relative to the selected sequence, using the transmitted check data, and a subsequent carrier frequency used in subsequent time period relative to the time slot position of the specific carrier frequency using the check data; and sequencing means for changing to the subsequent carrier frequency in both the mobile unit and the fixed station after a predetermined time period in accordance with the selected sequence.

10. A system for the transmission of data between a mobile unit and a fixed station as claimed in claim 9, the system further comprising:

a switching device in the fixed station for switching over between a logging-on mode and a normal transmission mode, wherein the check data is transmitted automatically if the switching device is switched to the logging-on mode.

11. A system for the transmission of data between a mobile unit and a fixed station as claimed in claim 9, wherein each of the fixed station and the mobile unit respectively includes a plurality of different sequences in which a plurality of carrier frequencies are changed from one time slot to the next.

12. A system for the transmission of data between a mobile unit and a fixed station as claimed in claim 9, wherein the processor in each of the fixed station and the mobile unit process the selection of the sequence via an algorithm.

13. system for the transmission of data between a mobile unit and a fixed station as claimed in claim 9, wherein the plurality of carrier frequencies lie in a 2.4 GHz ISM radio band.

* * * * *